United States Patent
Chen et al.

(10) Patent No.: US 6,459,487 B1
(45) Date of Patent: Oct. 1, 2002

(54) SYSTEM AND METHOD FOR FABRICATING COMPONENTS OF PRECISE OPTICAL PATH LENGTH

(76) Inventors: Gang Paul Chen, 955 W. El Repetto, Apt. #75D, Monterey Park, CA (US) 91754; Avishay Eyal, 385 S. Catalina Ave., #127, Pasedena, CA (US) 91106; Anthony S. Kewitsch, 515 Ocean Ave., #505-S, Santa Monica, CA (US) 90402; Victor Leyva, 1036 E. Woodbury Rd., Pasedena, CA (US) 91104; George A. Rakuljic, 402 19th St., Santa Monica, CA (US) 90402

(*) Notice: Subject to any disclaimer, the term of this patent is extended or adjusted under 35 U.S.C. 154(b) by 0 days.

(21) Appl. No.: 09/944,126

(22) Filed: Sep. 4, 2001

Related U.S. Application Data

(63) Continuation-in-part of application No. 09/898,469, filed on Jul. 6, 2001.
(60) Provisional application No. 60/230,618, filed on Sep. 5, 2000.

(51) Int. Cl.$^7$ ................................................. G01B 9/02
(52) U.S. Cl. ........................................ 356/491; 356/492
(58) Field of Search ................................. 356/491–493; 359/498

(56) References Cited

U.S. PATENT DOCUMENTS 3,304,428 A    2/1967   Peters (List continued on next page.)

FOREIGN PATENT DOCUMENTS

| EP | 425858 | 10/1990 |
|---|---|---|
| EP | 724173 | 12/1995 |
| WO | WO 00/11510 | 3/2000 |
| WO | WO 01/67143 | 9/2001 |

OTHER PUBLICATIONS

Harris, S.E.; Ammann, E.O.; Chang, I.C.; Optical Network Synthesis Using Birefringent Crystals. I. Synthesis of Loss-less Networks of Equal–Length Crystals; Journal of the Optical Society of America. vol. 54, No. 10, Oct. 1964, pp. 1267–1279.

Kimura, T.; Saruwatari, M.; Temperature Compensation of Birefringent Optical Fibers; Proceedings of the IEEE, Aug. 1971, pp. 1273–1274.

Kinsel, Tracy S.; Wide–Band Optical Communication System: Part I—Time Division Multiplexing; Bell Telephone Laboratories; Aug. 1970; pp. 2–18.

Carlsen, W.J.; Buhrer, C.F.; Optical Multiplexers; Electronic Letters; Jan. 29, 1987; vol. 23, No. 3, pp. 106–107.

Francon, M.; Polarization Interferometer from Optical Interferometry; Academic Press, 1966, pp. 156 Fig. 7.30 "Jamin Polarization Interferometer".

(List continued on next page.)

*Primary Examiner*—Frank G. Font
*Assistant Examiner*—Phil Natividad

(57) ABSTRACT

Optical components, particularly microoptic glass components used in synthesizing birefringence in filter systems based on polarization interferometer techniques, are fabricated using systems and methods which provide accurate frequency periodicity measurements. These measurements are derived from differential delays induced by in-process glass elements between beam components in a polarization interferometer unit and from progressive wavelength scanning across a wavelength band of interest. The consequent sinusoidal output variation has peak to peak spacings which are measured to provide frequency periodicity values from which precise length corrections for the optical elements can be calculated.

30 Claims, 6 Drawing Sheets

U.S. PATENT DOCUMENTS

| | | |
|---|---|---|
| 3,348,547 A | 10/1967 | Kavanagh |
| 3,536,921 A | 10/1970 | Caulfield |
| 3,729,249 A | 4/1973 | Harbegger |
| 4,327,971 A | 5/1982 | Kondo |
| 4,566,761 A | 1/1986 | Carlsen |
| 4,678,287 A * | 7/1987 | Buhrer ................. 350/404 |
| 4,685,773 A | 8/1987 | Carlsen |
| 4,693,244 A | 9/1987 | Daikuzono |
| 4,801,189 A | 1/1989 | Shaw |
| 4,976,517 A | 12/1990 | Kozuka |
| 5,305,136 A | 4/1994 | Smith |
| 5,457,758 A | 10/1995 | Snitzer |
| 5,680,490 A | 10/1997 | Cohen |
| 5,694,503 A | 12/1997 | Fleming |
| 5,734,762 A | 3/1998 | Ho |
| 5,805,751 A | 9/1998 | Kewitsch |
| 5,867,291 A | 2/1999 | Wu |
| 5,875,272 A | 2/1999 | Kewitch |
| 5,912,748 A | 6/1999 | Wu |
| 6,028,702 A | 2/2000 | Sasaki |
| 6,101,301 A | 8/2000 | Engelberth |
| 6,112,553 A | 9/2000 | Poignant |
| 6,130,971 A | 10/2000 | Cao |
| 6,147,341 A | 11/2000 | Lemaire |
| 6,154,590 A | 11/2000 | Jin |
| 6,169,831 B1 | 1/2001 | Adams |
| 6,181,851 B1 | 1/2001 | Pan |
| 6,327,405 B1 | 12/2001 | Leyva |

OTHER PUBLICATIONS

Harihan, P.; Optical Interferometry; Academic Press, 1985; pp. 121 & 146.

Katys, G. P., Kravtsov, N. V.; Chirkov, L. Ye.; Konovalov, S.M.; Modulation and Deflection of Optical Radiation; Modulyatsiya I Otklonenoiye Opticheskogo Izlucheniya; Moscow, Nauka, 1967, vol. 167, pp. 42–47.

* cited by examiner

SYSTEM AND METHOD FOR FABRICATING COMPONENTS OF PRECISE OPTICAL PATH LENGTH

REFERENCES TO RELATED APPLICATIONS

This application relies for priority on U.S. provisional application No. 60/230,618 filed on Sep. 5, 2000 and entitled "System and Method for Fabrication Components of Precise Optical Path Length", P. Chen et al, and a continuation-in-part of U.S. application Ser. No. 09/898,469 filed Jul. 6, 2001, still pending by A. Eyal et al for "Interleaver Filters Employing Non-Birefringent Elements".

FIELD OF THE INVENTION

This invention relates to methods and systems for the fabrication of optical elements of precise length and more particularly to fabrication of elements having optical path lengths exact enough to be used in applications for optical communications which use optical interferometry.

BACKGROUND OF THE INVENTION

There have long been needs for exactness in mechanical and optical devices and systems, and these needs have heretofore been met by a variety of techniques, from mechanical to optical. Examples of the latter are found in a 1922 publication of the Department of Commerce, entitled "Interference Methods for Standardizing and Testing Precision Gage Blocks" by C. G. Peters and H. S. Boyd, which describes light wave interference methods which are not subject to the "appreciable errors" found with "micrometer microscopes" and "contact instruments". The authors describe optical interference approaches imparting about an order of magnitude improvement, e.g. from 0.25 to 0.025 microns. While directed to the calibration of gage blocks, this article nonetheless evidences what even today must be acknowledged as an ingenious optical approach to ascertaining the dimensions, flatness and parallelism of gage surfaces.

In modern telecommunication systems, however, dimensional measurements are embedded in a number of other factors which arise from the way in which optical elements are used. In telecommunications systems using device wavelength division multiplexing (DWDM), for example, polarization interferometry that requires precise differential delays between different beams is used in generating a required filter function. Interleavers employing these relationships are described in U.S. application Ser. No. 09/898, 469 referenced above to provide athermal operation within individual stages of multi-stage multiplexers and demultiplexers.

The optical path length of an optical component through which light traverses is dependent not only on distance but also on intrinsic properties, such as the index of refraction, of the components. Modern optical systems must meet such demanding specifications that optical path length has become an important consideration. The fabrication of interleaving optical filters for DWDM using athermal delay line interferometers requires strict control of the optical path lengths of the glass elements. This control is necessary to meet the tight tolerances on absolute channel frequencies for DWDM applications. Traditional physical path length measurements such as mechanical or non-contact thickness probes with sub-micron accuracies are thus not adequate because the optical path length depends on both physical thickness and the absolute index of refraction of the medium. Also, for individual glass melts the index of refraction of typical optical glasses varies by $10^{-5}$ to $10^{-4}$ from a nominal or target value despite best production methods. This variation introduces substantial uncertainty in optical path length even if the physical thickness of the glass is known exactly. A particular additional requirement is that the optical path length of any "glass window" must be accurately measured at a chosen wavelength of operation (e.g., 1550 nm) to account for material dispersion.

SUMMARY OF THE INVENTION

Methods and systems for fabricating optical elements such as microoptic elements used in introducing differential delays in DWDM interleavers, use a number of different measurements of frequency periodicity at successive evolutionary processing steps leading to final sizing. The method and system provide precise frequency periodicities, with optical elements being so interrelated as to be acceptably athermal at a chosen frequency. The optical elements thus form the basis for a desired transmission spectrum for a DWDM interleaver. Frequency periodicity is synthesized by measuring output amplitudes derived from differential delays of a test beam at a plurality of incrementally varying wavelengths in the wavelength range of interest, using polarization interferometers to introduce a filter function.

To fabricate to interleaver precision, the optical frequency response of the interleaver must be characterized to sub-GHz in terms of accuracy. The first step in the characterization process is to measure the temperature dependence of the glass, and then calculate to high accuracy the physical lengths needed for both athermal operation and desired frequency periodicity. A first optical element or window is then ground and polished to the desired frequency periodicity given by a first calculation. For example, consider the case of a 50 GHz interleaver with a 100 GHz free spectral range (FSR). The first window is fabricated from the higher index glass of a pair of glasses to be used and is polished to within about 0.04 GHz of the target value to ensure good temperature insensitivity of the final interleaver. This glass element is left in the optical frequency measurement system, and the second window is then ground, polished and repeatedly measured by placing into the second arm of the optical path length measurement system until the frequency periodicity of the combined two glass interleaver is 100.00+−0.03 GHz. A like process is utilized to fabricate time delay elements for other FSR's, such as 25 GHz to 200 GHz.

In accordance with the invention, the frequency periodicity is ascertained during different steps using the differential delays introduced between different optical elements or one optical element and air in the delay paths of a polarization interferometer. An input test beam is propagated through both delay paths, but varied incrementally in wavelength through a selected range of wavelengths. This results in derivation of a sinusoidal variation from which peak to peak spacings determinative of frequency period can be calculated so that optical path length correction can be computed to a degree of accuracy dependent on the state of dimensional refinement of the element. By starting with precursor elements large enough in transverse area for multiple microoptic elements, and using the given oversize in thickness in the precursors, removal of thickness to final dimension can suffice for all microoptic elements at the same time.

To achieve these tolerances, the measurement system described herein meets the extremely high accuracy standards implicitly required for the measurement of optical path length. During the final polishing process of the glass window blanks, the optical path length is periodically measured until the target value is achieved. This measurement technique enables conventional polishing techniques to achieve the desired thicknesses.

Precise optical path length measurements have been achieved, accurate to better than 10 ppm. That is, a glass element with a free spectral range of 100.000 GHz can be fabricated to have a period accurate to better than 1 MHz. The parameter that is directly measured is the optical frequency response of the interleaver in about the 1500 to 1600 nm wavelength range but the determinative result is the establishment of optical path length.

A measurement system in accordance with the invention employs a tunable laser, controlled by a data processor to scan a selected wavelength range in equal, small increments, to generate wavelength varying test beams. The beams are directed through a differential delay system using polarization interferometry to generate a wavelength dependent output. This is received at a spectrum analyzer which stores the sinusoidally varying amplitude readings from the different wavelengths for analysis.

The data processor receives the data and employs a least squares fit program to analyze the sinusoidal variations and ultimately derives the length correction needed for an optical element. The optical measurement apparatus for introducing differential delays in microoptic elements, which area used in testing temperature dependence is in the form of a single stage interleaver. Measurement apparatus for large precursor elements incorporates stages which can be adjusted in two dimensional to position the optical element. Additionally, using illumination directed from a broadband light source through the optical element onto the spectrum analyzer, the tilt and tip orientation of the optical element can be optimized before differential delay readings are made. The laser beam power is advantageously monitored by a power meter coupled to provide measurement signals to the data processor for use in equalizing readings derived during scanning. Also a polarization scrambler is preferably employed in the beam path where polarization dependence in the interferometer may affect readings, by assuring that there is no dominant polarization.

BRIEF DESCRIPTION OF THE DRAWINGS

A better understanding of the invention may be made by reference to the following description, taken in conjunction with the accompanying drawings, in which.

DETAILED DESCRIPTION OF THE INVENTION

Figure 1:
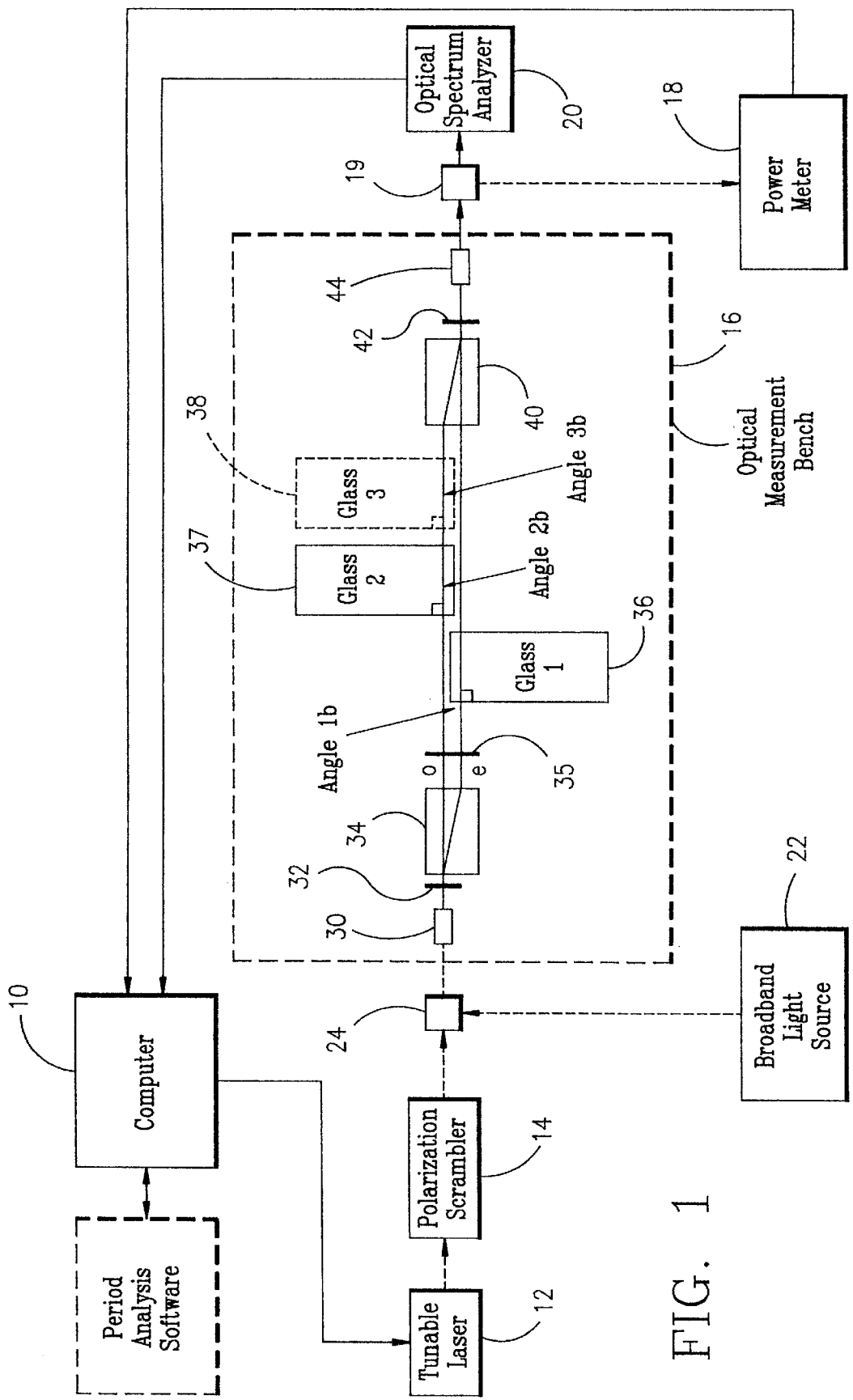
FIG. 1 is a block diagram of an optical measurement system in accordance with the invention that includes a top view of a polarization interferometer optic.

Extremely tight fabrication tolerances must be maintained between the differential optical paths of a system such as an advanced state of the art interleaver (e.g. Ser. No. 09/898,469 supra) to both provide athermal operation and to achieve the desired frequency periodicity. The differential optical path length between the two arms must be kept constant to a high level of precision (1 part in $10^4$) to maintain a constant period of 100.00 or 200.00 GHz, for example. The approximate optical frequency is 193.000 THz, and the absolute frequency of each channel should be aligned to the ITU wavelength grid to better than 1 GHz. The deviation of the frequency period from the target value, for a typical 80 channel C band application, should be below 50 MHz. Practically, there is no glass material available with optical path length temperature dependence matched to the necessary level to that dependence exhibited by air. Individual glasses have a relatively large dependence of the optical path length on temperature. Therefore, a second glass material is necessary to compensate for the temperature dependence introduced by the first glass, and a third glass material can also be used for further improvement. Furthermore, it is advantageous to place glasses of substantially equal length in both arms. This eliminates the dependence of the interleaver's frequency response on ambient air conditions, which can be significant for 50 GHz or denser interleavers. The length of glass is selected to give the correct optical path length difference. The two glasses also should be matched in their optical path length temperature dependence. 50 and 100 GHz interleavers include glass elements cascaded from length L, such as 2L and 4L in a stage, where L is typically about 5 mm. The tolerances of L are on the submicron level, requiring precise thickness or optical path length control during the polishing process.

Some considerations based on the theory of the polarization interferometer are desirable to understand the degree of exactitude needed in optic components for optical interferometer systems. The transmission frequency response in terms of optical power of a single interleaver stage is given by:

$$T = \sin^2(\phi), \tag{1}$$

where the phase for an N glass interleaver is given by:

$$\phi = \frac{2\pi f}{c}((n_1 - n_{air})L_1 - (n_2 - n_{air})L_2 - \ldots - (n_N - n_{air})L_N). \tag{2}$$

The frequency dependence of the phase for an N glass interleaver is:

$$\frac{\partial \phi}{\partial f} = \frac{2\pi}{c}((n_1 - n_{air})L_1 - (n_2 - n_{air})L_2 - \ldots - (n_N - n_{air})L_N) + \frac{2\pi f}{c}\left(\frac{\partial n_1}{\partial f}L_1 - \frac{\partial n_2}{\partial f}L_2 - \ldots - \frac{\partial n_N}{\partial f}L_N\right) \tag{3}$$

In the following, we will focus specifically a two glass interleaver design; however, similar analysis applies for the case of three or more glass types. For this case of two glasses the temperature dependence of the phase is:

$$\frac{\partial \phi}{\partial T} = \frac{2\pi}{c}\left((n_1 - n_{air})\frac{\partial L_1}{\partial T} - (n_2 - n_{air})\frac{\partial L_2}{\partial T}\right) + \frac{2\pi f}{c}\left(\frac{\partial n_1}{\partial T}L_1 - \frac{\partial n_2}{\partial T}L_2\right) \quad (4)$$

The frequency periodicity of the total interleaver is:

$$\Delta f = \frac{c}{((n_1 - n_{air})L_1 - (n_2 - n_{air})L_2) + f\left(\frac{\partial n_1}{\partial f}L_1 - \frac{\partial n_2}{\partial f}L_2\right)} \quad (5)$$

For example, for a 50 GHz interleaver, $\Delta f$=100.00 GHz, and for a 100 GHz interleaver, $\Delta f$=200.00 GHz. The frequency periodicity of individual glasses 1 and 2 under the condition of temperature compensation is:

$$\Delta f_1 = \Delta f \left(1 - \frac{\frac{\partial f_1}{\partial T}}{\frac{\partial f_2}{\partial T}}\right) \quad (6)$$

$$\Delta f_2 = \Delta f \left(\frac{\frac{\partial f_2}{\partial T}}{\frac{\partial f_1}{\partial T}} - 1\right) \quad (7)$$

By choosing $L_1=L_2$, the temperature dependence of air factors out of the interleaver frequency response. If this condition were not met, a 6 mm element of air would contribute a frequency shift of approximately 3 GHz/10° C. This effect also depends on whether the interleaver operates under constant pressure or constant volume conditions after it is sealed and packaged. Therefore, for highly stable telecom applications, insensitivity to inner atmosphere (e.g., air pressure or temperature) is necessary.

Measurement System

A functional diagram of a measurement system used to characterize the glass elements is illustrated in FIG. 1. The measurement system comprises a number of operative elements: a computer 10 with frequency period analysis software, a tunable laser 12 operated in a wavelength scanning mode by the computer 10 using scanning control algorithms, a polarization scrambler 14, an optical measurement bench 16, a power meter 18 to which the laser beam can be directed after the bench 16 at a junction 19 comprising a switch, fiber or splitter, and an optical spectrum analyzer 20. the power meter 18 and the spectrum analyzer 20 provide signals to the computer 10 for use in normalizing the readings. The computer 10 is interfaced to the tunable laser 12 using a standard bus such as GPIB, serial, or parallel, and the optical measurement bench 16 provides communication between the tunable laser 12, optical power meter 18 and optical spectrum analyzer 20, through switches or optical fibers. A separate, broadband light source 22 provides light into the laser beam path via a junction 24 which may comprise a beam combiner on an optical switch.

Figure 2:
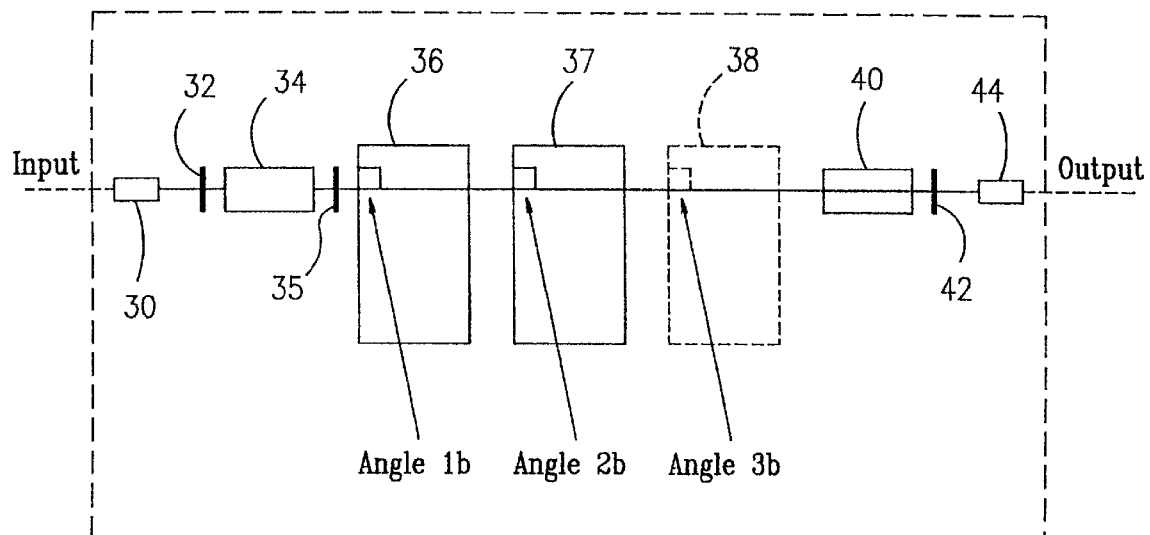
FIG. 2 is a side view of the optical layout of the polarization interferometer optical path length measurement system of FIG. 1.

The optical measurement bench 16 consists of a series of polarization beam splitters, ½ waveplates and polarizers, as seen in both FIGS. 1 and 2, corresponding in substantial part to the basic elements of the interleaver. Beam displacers, fabricated from birefringent crystals, can be used for both the polarization beam splitters and polarizers. In general terms, an incoming beam from the laser 12 is split in the optical measurement bench 16 into two polarized beams which are laterally displaced from one another but exit the crystal along parallel paths. One outgoing beam from the displacer is e polarized, the other is o polarized, where the orientations of the e and o polarizations are dictated by the crystal orientation of the beam displacer. The parallel beams are directed through differential delay paths which are used in the testing of different glasses or relationships before the beams are recombined for the remainder of the measurement.

Several optical layouts achieve the desired optical measurement response. This example (FIGS. 1 and 2) utilizes an input collimator 30, a polarizer 32 (Coming Polarcor™ for example) oriented at 45° to the horizontal, a first horizontal beam displacer 34, and a true zero order ½ waveplate 35 to rotate the polarization of the displaced e and o beams by 90° before one or more glass elements to be measured for optical path length. The elements, called windows or pucks when in multi-element size, or microoptics elements if they are sized for use in an interleaver, may be used singly or in combinations in the measurement bench 16. in this example, two windows, 36, 37 (designated Glasses 1 and 2) are depicted as in positions they occupy (individually or concurrently) intercepting the beam paths in the delay segments. An optional window 38, shown in dotted lines in FIGS. 1 and 2, is Glass 3 which may be measured also if a three glass stage is to be fabricated. A second horizontal beam displacer 40 follows the windows 36, 37 to recombine the two beams, an output polarizer 42 oriented at −45° to the horizontal, and an output collimator 44. All optics are antireflection coated in the 1500 to 1600 nm window, and the zero order waveplate is here designed for 1550 nm operation. Note that this optical layout closely resembles a single stage of the actual microoptic interleaver described in U.S. patent application Ser. No. 09/898,494 by Eyal et al., but on a larger scale to allow the precursor window blanks to be tested before dicing into microoptic windows.

The input optical beam is here, however, not dependent on the state of polarization of the laser 12 output. The polarization scrambler 14 rotates the input beam polarization repeatedly during the duration in which each beam of different wavelength is transmitted. The power meter 18 samples the beam amplitude and is operated separately from the optical spectrum analyzer 20 after recombination, so that the computer 10 can normalize the readings from the spectrum analyzer 20.

This arrangement provides a relatively simple yet precise means of sampling the wavelength scanning test beams. If the laser output is uniformly polarized, the components may be oriented suitably to that reference. If the beam has an arbitrary state of polarization, the input beam may be split into upper and lower pairs of orthogonal polarizations, to provide a polarization independent output as in the Eyal et al application.

The input horizontal beam displacer 34 separates the input beams into e and o polarized beams, horizontally spaced by about 0.7 mm. The e and o beams may pass through one or more different glass elements 36, 37, etc., depending upon the measurement to be performed. Upon propagating through the glass elements, 36, 37, etc., the two beams acquire a relative phase shift between one another, because of the different indices of refraction of the glasses, and next enter a ½ waveplate 35 oriented at 45° to convert the o to e and the e to o polarizations. The two beams are then recombined into a single output beam by the output horizontal beam displacer 40. The waveplate ensures that the optical path lengths traveled by the two beams (left and right) through the displacers 34, 40 are equal. The lengths of the input and output beam displacers 34, 40 are also precisely matched to ensure that the split beams are recombined into a single spot, and to precisely match the net distance each beam travels within the two displacers. Any residual path-length mismatch is precisely measured and mathematically corrected for in the data processing performed during the measurements.

This optical system is connected to the lightwave measurement system (FIG. 1) which scans and processes the wavelength response of the polarization interferometer. An Agilent 81641 tunable laser mainframe 12 provides a test beam to the interferometer input, and the interferometer output is measured by the single channel optical power meter 18 to record the transmitted optical power in transmission on the computer 10. The laser 12 is scanned from 1520 to 1570 nm with a 0.01 nm step size for a total of 5000 points. The signals measured by the lightwave measurement system constitute a sinusoidal amplitude response varying with optical frequency. The data is least-squares fit by the computer 10 and period analysis software to a sinusoid, the two fit parameters being the optical frequency period and the phase to determine the frequency period to a few parts in 10,000. A 50 GHz interleaver, for example, requires an optical frequency period of 100.00 GHz. The control of the laser wavelength scanning, data acquisition, and least-squares curve fitting is performed by commercial software, for example, LabVIEW from National Instruments, Inc.

The optical path length of the glass windows 36, 37, 38 depends partly on the angle of incidence of the beams with respect to the windows. Normal incidence corresponds to the shortest optical path length. To ensure that the one or more glass windows are positioned exactly normal to the optical beams (within a few arcmins), an Agilent 71452B optical spectrum analyzer functioning with the broadband light source 22 in the communication link may be used to monitor the spectral response of the polarization interferometer in real time as the tilt and tip of glass windows 36, 37 are adjusted.

Figure 3:
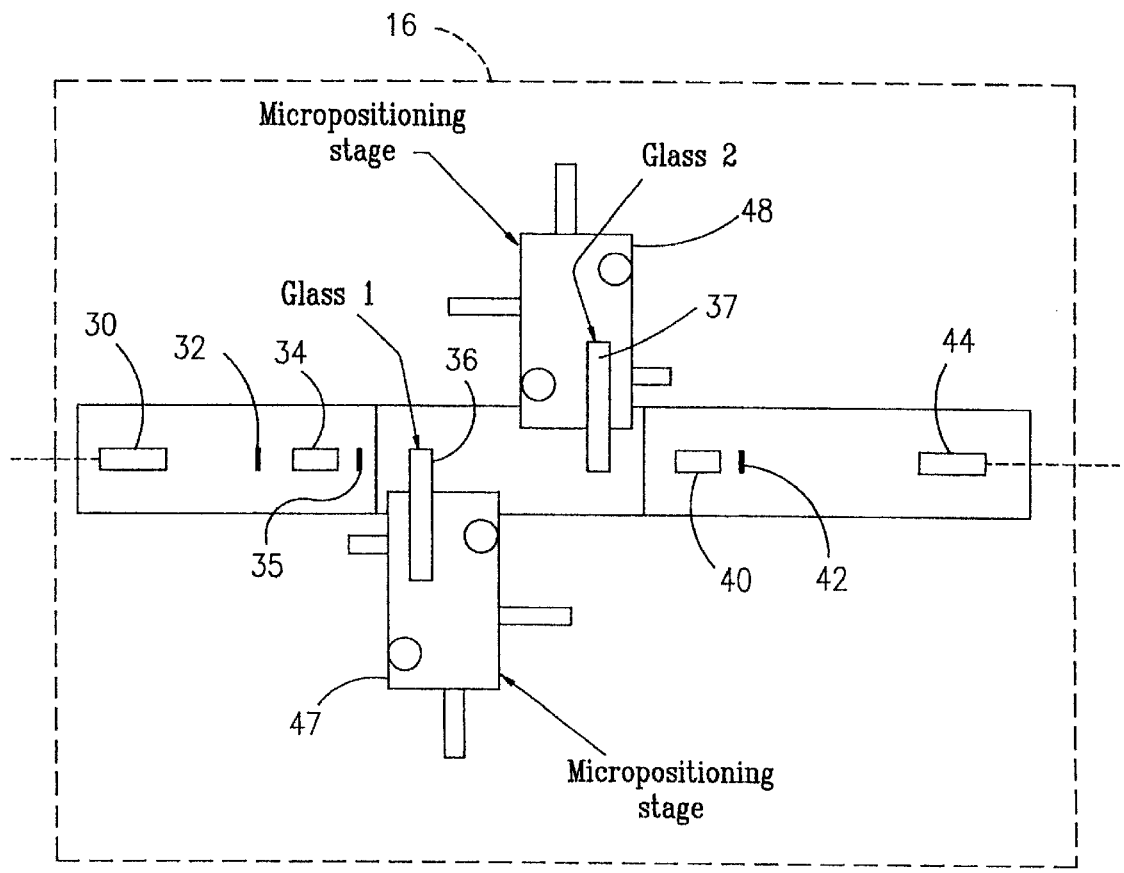
FIG. 3 is a top view indicating the location of positioning elements for placement of glass elements into a polarization interferometer.

Upon inserting only the first piece of glass, e.g. 36, the tilt and tip are to be adjusted until the frequency period of the interleaver is minimized, which minimizes the optical path length in the glass. FIG. 3 illustrates the apparatus used to achieve orientational adjustment of the glass windows during the measurement process, with commercial micropositioning tables 47, 48 being employed that are adjustable in two angular directions, specifically in tilt and tip. Such micropositioning tables are available from Newport Corp. and other optical equipment suppliers. For the second piece of glass, the tilt and tip are also adjusted until the frequency period of the interleaver is maximized or minimized, depending on the glass type, index of refraction and its length. Additional pieces of glass are to be inserted using a similar procedure. Those angles (1b, 2b, 3b) which are to be maintained close to normal incidence are indicated as small squares in FIGS. 1 and 2. If the angles are not 90 degrees, then the optical path length measurement is incorrect. The beam displacers and waveplates are epoxied in place to maintain mechanical stability during the measurements, and the input and output collimators are welded to the optical bench. The polarization scrambler 14 is typically installed in-line with the tunable laser output to ensure that the state of polarization is scrambled or depolarized at the input to the measurement system 16.

Characterization of Temperature Dependence of Glasses

Figure 4:
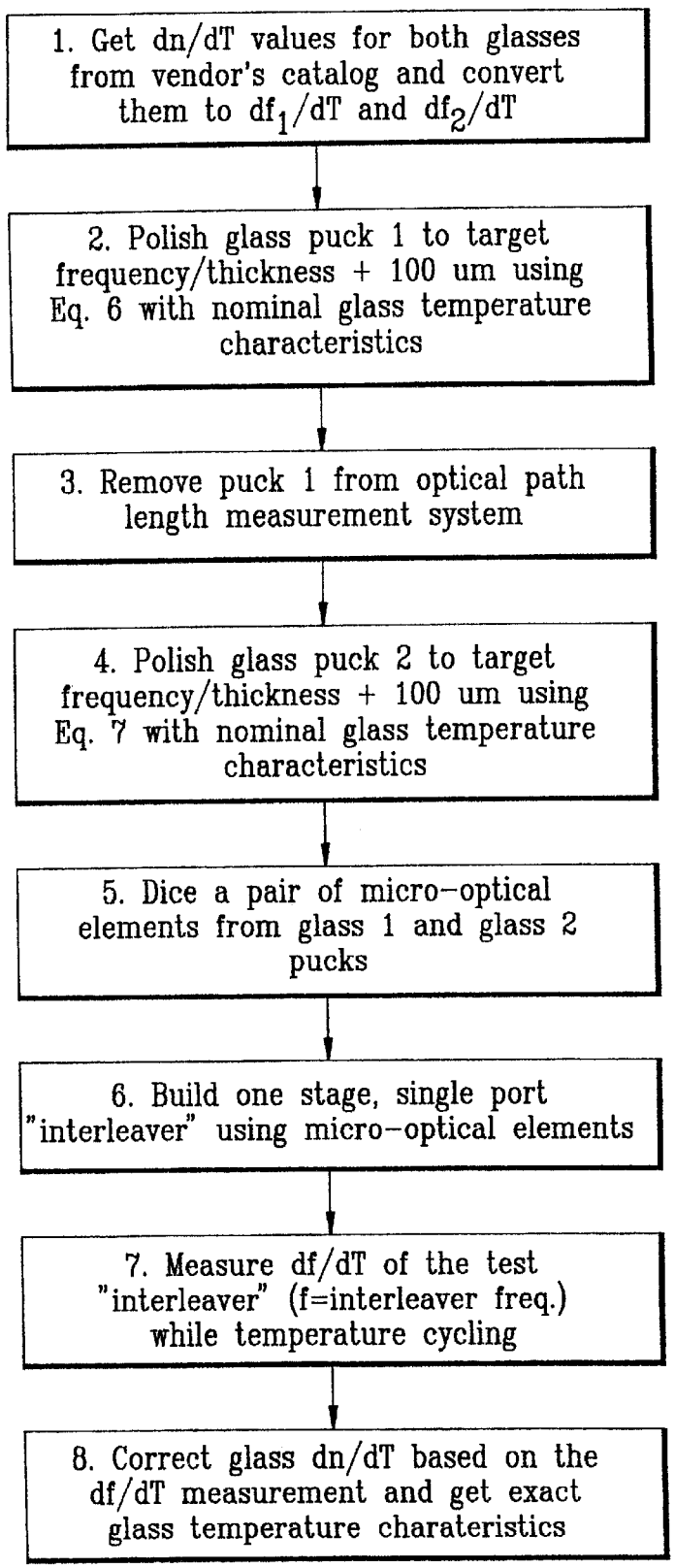
FIG. 4 is a process flow chart depicting steps in determining glass temperature characteristics to high accuracy.

FIG. 4 is a flow chart outlining the steps required to characterize glass delay line elements to the level needed to temperature compensate interleavers while also achieving the precise frequency periodicity. The flow chart of FIG. 5 depicts processing steps used after this characterization has been completed.

This example applies to a two glass design, but the method can be readily extended to a three or more glass design using Equations 2–3 above. These delay line elements are to be processed as large glass "pucks" or plane parallel windows, which are subsequently diced into microoptic elements. The first step is to select suitable glasses which compensate for one another's temperature dependence. This is based initially on the therrno-optic and thermal expansion contributions to the temperature dependence, as determined from the vendor specifications. These published parameters, which are not adequately precise for present purposes are input into Equations 6 and 7 to provide the target frequency periodicity of each glass. The glass pucks are then ground and polished to be at some predetermined frequency above the target frequency. Typically, these frequencies are chosen to correspond to pucks each 100 ums thicker than the predicted target thicknesses (each about 9 mm thick). A microoptic element from each puck is then diced and used to build, in effect a one stage interleaver, from which the temperature dependence of the center frequency is measured. These measurements enable the residual temperature dependence of the pair to be calculated, from which the errors in the published specifications can be calculated and corrected for. Each glass melt has slightly different index of refraction and thermal characteristics, so that in general this thermal characterization process should be repeated for each glass melt, and used in calculating the residual temperature dependence.

Method to Fabricate Glass Elements of Precise Optical Path Length

Figure 5:
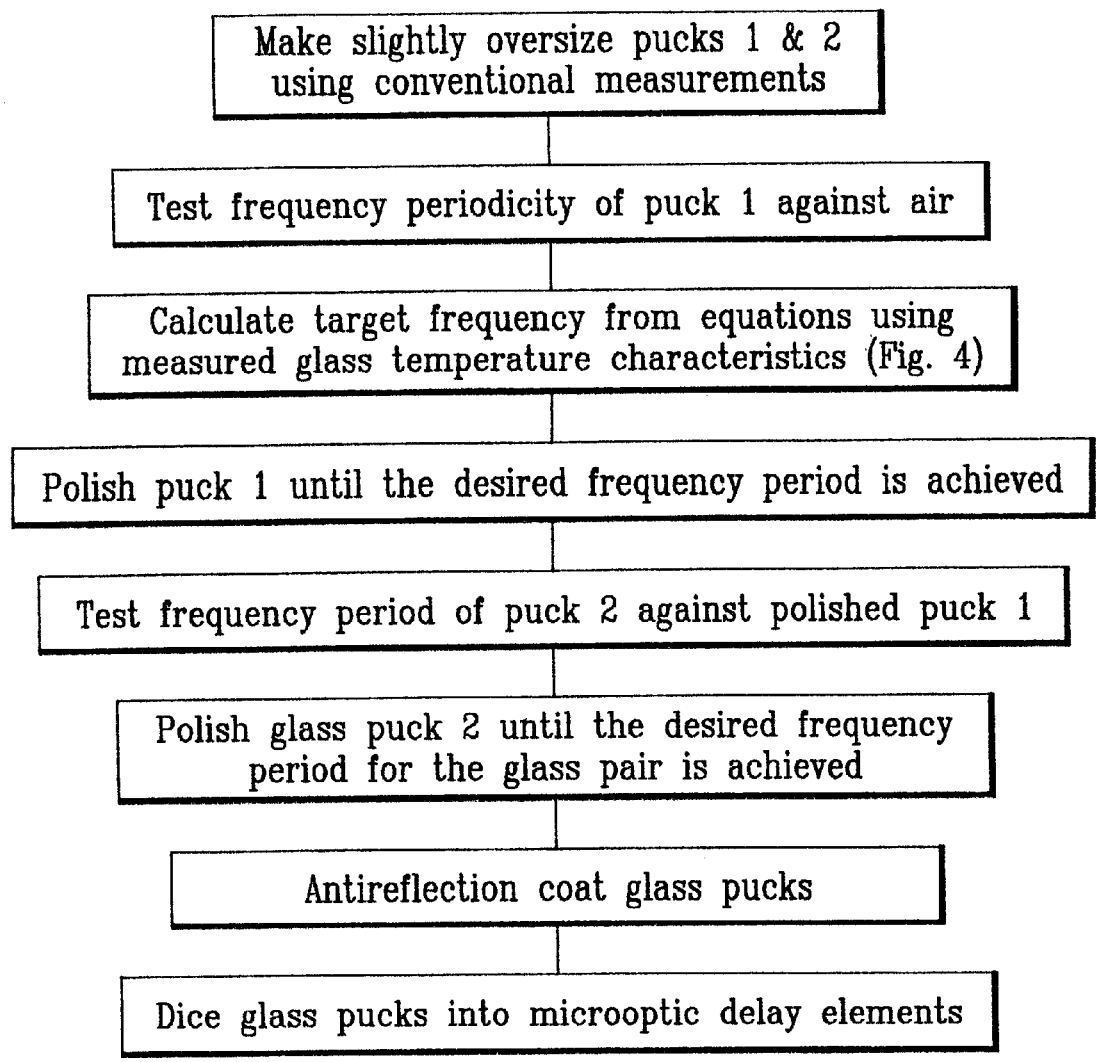
FIG. 5 is a process flow chart depicting steps in fabricating glass elements to high accuracy in frequency optical path length.

FIG. 5 illustrates the method by which glass elements are fabricated to a precise optical path length, after the measurements have been made which characterize the temperature dependence of the glasses. The input signal to the optical measurement bench 16 is generated by the tunable laser 12 which scans the wavelength region of interest (C or L band). The polished window blanks e.g. 36, 37 are first ground and polished to a thickness slightly over the target value. Conventional thickness measurement techniques are used up to this point. Next, the optical thicknesses of the parts are determined using the measurement system described herein and the following sequence. First, one oversize glass element e.g. 36, is placed in the optical measurement bench 16 and aligned. Next, the amount of material to be removed is calculated, and further material is removed. This step is typically a final mechanical polishing step which can be carried out commercially to a high degree of precision once the absolute value of material to be removed is known. Alternatively, processes such as reactive ion etching or chemical etching can be utilized to remove the small amount of material during this final process step. Magneto-rheological polishing is an alternate technique which allows precise figuring of both the flatness and optical thickness of individual polished windows. When the first glass element 36 has been polished to the correct optical path length, the second glass element is inserted, and it is polished until the second target frequency periodicity is achieved. This process may be continued if more than two glass elements are used in the design. Note that the polishing may be simultaneously conducted on a large number of relatively large glass "pucks" of identical thickness. This provides the advantage of batch processing because thousands of microoptic elements are produced during each production run.

The windows are ground on a double sided ring lap using aluminum oxide slurry, and subsequently are polished on a similar double sided ring lap using cerium oxide slurry. Both these double sided machines optimally utilize pitch polishing rather than pad polishing. Alternately, a conventional double sided polishing machine using epolyurethane pads, for example, may be suitable for the lapping and polishing operations. In either approach, the double sided polishing has the inherent advantage that the flatness errors of both surfaces are in general complementary. As a consequence, the transmitted wavefront distortion of these plane parallel windows is inherently low, which is important to maintain consistent optical path length across the entire window. These windows are fabricated to provide a transmitted wavefront distortion of better than $\lambda/3$ to $\lambda/10$ (where $\lambda=633$ nm) across the 2 inch diameter substrate.

Processing of large diameter parts provides several advantages; namely, excellent surface flatness, transmitted wavefront distortion, parallelism of polished surfaces, and batch processing. The optical path length or physical thickness of the parts can be measured during the polishing stage to determine how much material should be removed. The removal rates are a well characterized part of the process (e.g., um per hour). This ensures that the glass elements are fabricated to the correct thickness to guarantee temperature insensitivity and to achieve the correct interleaver frequency response.

After these frequency targets are achieved, the glass is diced into a large number of identical microoptic windows. Upon dicing these large windows into microoptic delay line elements of, for example, 2.6×2.6 mm cross section, the residual power contribution to the flatness, which scales as the square of the diameter of the part, results in a transmitted wavefront distortion of less than $\lambda/300$ across the individual parts. Note, however, that this level of wavefront distortion is in practice not measureable.

Figure 6A:
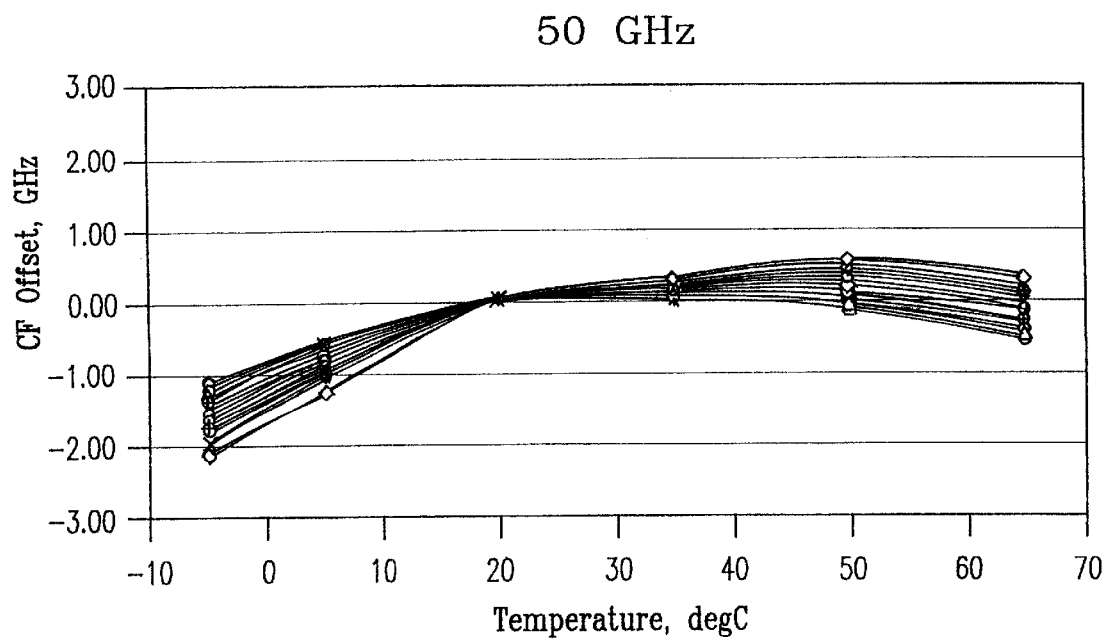
FIGS. 6A and 6B are graphs presenting the temperature stability of the center frequency of fabricated using the process outlined in FIGS. 4 and 5.
Figure 6B:
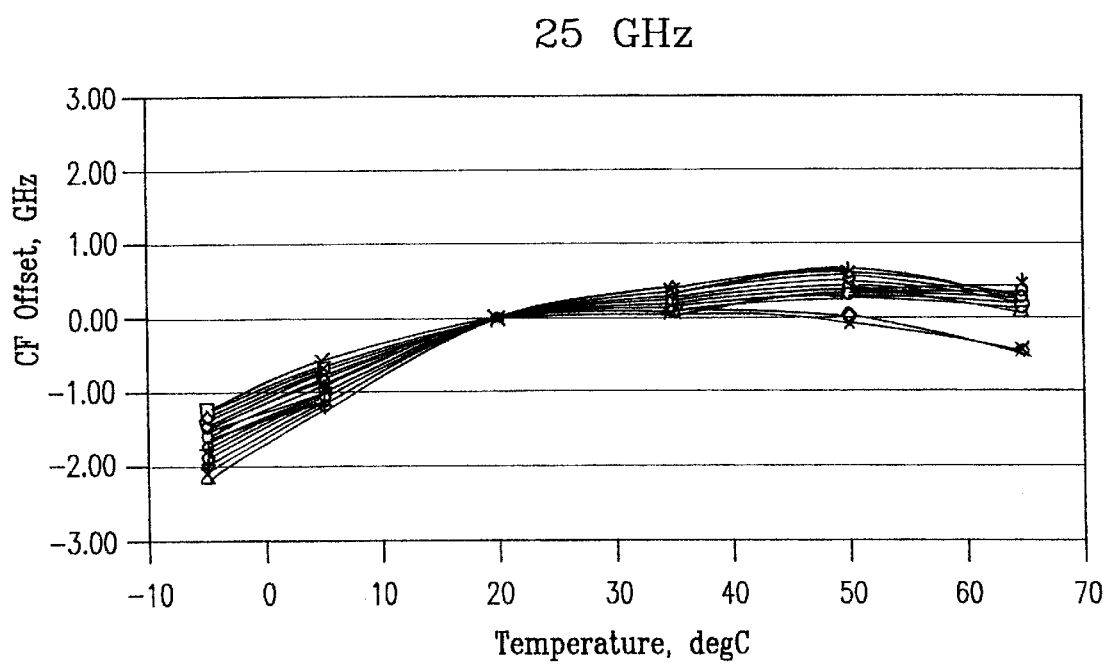

In practice, this procedure gives extremely good temperature stability of the center wavelength. FIGS. 6A and 6B illustrate some typical dependencies of the center frequency with temperature, for 50.000 and 25.000 GHz interleavers, respectively. Note that the frequency drift varies approximately quadratically with center frequency within the passband. The linear dependence has been effectively nulled. The total shift with temperature is typically less than 2 GHz over the −5 to 65° C. operating temperature range for this group of interleavers.

Figure 7:
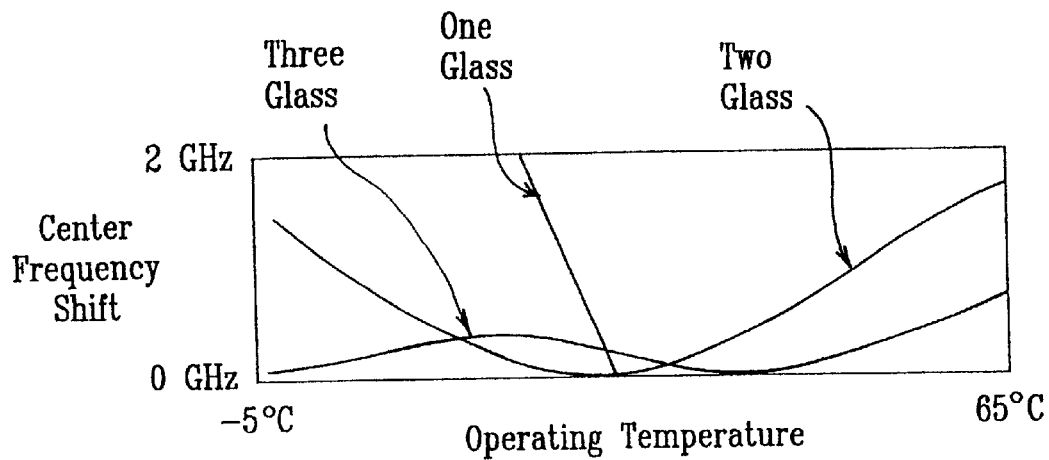
FIG. 7 is a graph illustrating the center frequency temperature dependence achieved with two and three glass designs.
Figure 8:
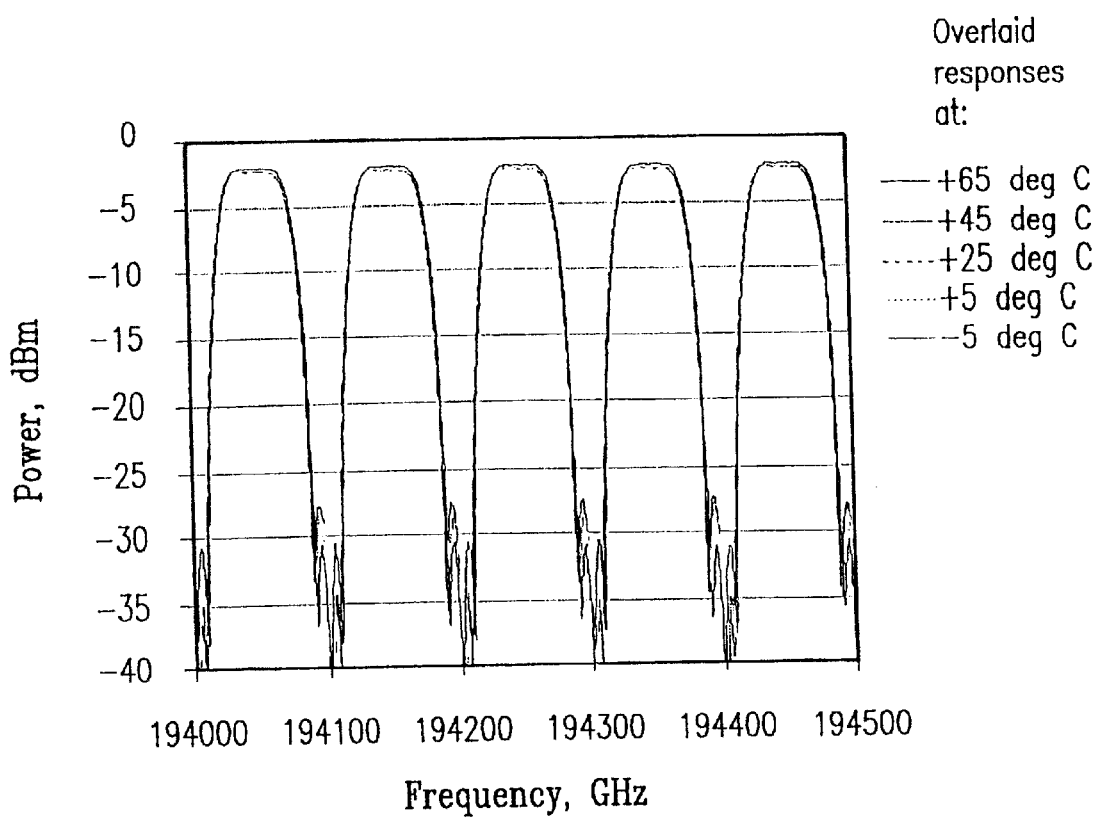
FIG. 8 is a graph illustrating the temperature dependence of the response of an interleaver fabricated in accordance with the process depicted in FIGS. 4 and 5.

By adding a third glass element, additional design flexibility is obtained. The residual quadratic temperature dependence can then be nulled, leaving only a cubic dependence. FIG. 7 illustrates the residual temperature dependence for a two and three glass design. FIG. 8 depicts the resulting transmission spectrum of an interleaver using the process described herein to fabricate a 50 GHz interleaver of precise period and low center frequency drift with temperature. The measured transmissions at −5,+5,+25,+45, and +65 degrees C are overlaid for comparison.

Systems and methods in accordance with the invention enable noncontact measurement of optical path length in terms of the thickness of optical windows to an accuracy of 100 nanometers. Further it is amenable to use in high production processes since large precursor blanks can be dimensioned together to provide a multiplicity of individual microoptic elements. While particularly suited for meeting the critical requirements of optical communication system, such as interleavers, these systems and methods are applicable wherever comparable requirements exist.

We claim:

1. A system for enabling manufacture of elements of precise optical path length to levels of precision needed for DWDM filtering applications, comprising:

an adjustable monochromatic optical wavelength source providing a test beam output;

a scanning control coupled to the source to vary the test beam output sequentially through incrementally varying wavelengths;

an optical delay line system coupled to receive the test beam from the source and including at least one input beam displacer for receiving the test beam and propagating two beams in parallel along a first and second delay path, at least one output beam displacer for recombining beams from the first and second delay paths into a single, co-propagating path, the two delay paths each being adapted to receive one or more glass elements, each of different optical path length, and an optical transmission analysis system receiving recombined beams from the delay line system and providing an output representing the frequency periodicity of the recombined optical beams, the frequency periodicity resulting from the interference of beams traveling along the different optical delay paths.

2. A system as set forth in claim 1 above, wherein the transmission analysis output is a sinusoidal variation having a frequency periodicity measurable by the peak to peak spacing in the sinusoid output.

3. A system as set forth in claim 1 above, wherein the system also includes a data processor in communication with the transmission analysis system for measuring the peak to peak frequency spacing in the sinusoidal output, mathematically extracting the frequency period, and calculating length corrections needed in the optical elements.

4. A system as set forth in claim 1 above, wherein the adjustable wavelength source comprises a tunable laser, a polarization scrambler in the test beam path to the optical delay line system, an optical power meter monitoring the test beam power, and the data processor comprises scanning control algorithms to interrelate the outputs from the power meter and the transmission analysis system to provide a least square fit deviation of frequency periodicity from the measured output.

5. A system as set forth in claim 4 above, wherein the delay line system includes adjustable glass element support stages in each of the delay paths for selectively interposing glass elements relative to the individual delay paths, and wherein the system further includes a broadband light source positioned to illuminate the transmission analyzer through the glass elements, so that the elements can be adjusted for precisely normal incidence angle in relation to output from the optical transmission analysis system, and wherein the transmission analysis system comprises a spectrum analyzer.

6. A system as set forth in claim 3 above, wherein the scanning control operates the wavelength source at successive wavelength steps in the range of 1520 to 1570 nm.

7. A method of providing sets of interrelated glass elements for use in DWDM applications, wherein the sets of elements provide an athermal interferometric function with a selected frequency periodicity, comprising the steps of:

calculating preliminary target values for at least two different glasses which establish the athermal condition and the frequency periodicity desired for the interferometric function;

initially fabricating lengths of glass elements of the different materials to slightly greater dimensions than the target lengths;

generating a sinusoidally varying transmission response using the initially fabricated glass elements in different delay paths;

calculating a temperature compensated frequency periodicity from the sinusoidally varying transmission function; and adjusting the lengths of sets of glass elements to final target lengths having selected frequency periodicity and substantially athermal response at a center wavelength.

8. The method as set forth in claim 7 above, wherein the steps of generating a sinusoidally varying frequency response comprises the steps of directing a series of beams varying incrementally in wavelength through the initially fabricated lengths, combining beam components from the different delay paths, and measuring the amplitude responses from the different incrementally varying wavelength beams.

9. The method as set forth in claim 8 above wherein the step of calculating the frequency periodicity comprises calculating the peak to peak spacing in the sinusoidally varying frequency response.

10. The method as set forth in claim 8 above, wherein the varying wavelengths are substantially centered on a selected central operating wavelength, and wherein the method further comprises the steps of testing temperature response at the central wavelength of the adjusted lengths of glass elements under interferometric conditions and adjusting the lengths of the glass elements to the final target lengths.

11. The method as set forth in claim 7 above, wherein the lengths of glass elements in the different delay paths comprise one glass element in one delay path and two glass elements in the other delay path.

12. The method as set forth in claim 7 above, wherein there are individual glass elements of different indices of refraction in the two delay paths.

13. The method as set forth in claim 7 above, wherein the glass elements for DWDM applications are microoptic elements and the initially fabricated elements are of substantially greater cross-section than the microoptic elements, and further including the steps of forming at least a pair of microoptic elements from the initially fabricated elements; employing such microoptic elements in the delay paths in to generate a sinusoidally varying transmission response, measuring the temperature dependence at a center wavelength, calculating final target lengths needed for frequency periodicity and athermal characteristics, measuring the frequency periodicity of the initially fabricated elements, calculating the correction needed for establishing the final target lengths, removing material from the initially fabricated elements to establish the final target lengths, and dividing such elements into microoptic elements of the final target lengths.

14. The method of fabricating microoptic elements of precise optical path lengths for use in optical communication systems employing differential delays in interferometric processes in which frequency periodicity and stable temperature response at a center wavelength must be precise, comprising the steps of:

fabricating at least two different types of precursor optical elements that can each be formed into multiple microoptic elements, the precursor elements having preliminary thicknesses which are oversized relative to values calculated on the basis of nominal index of refraction, thermal expansion coefficient and thermooptic properties for each precursor optical element;

separating individual precursor microoptic elements from each precursor optical element;

employing precursor microoptic elements of at least two different types of delay elements in a multi-frequency interferometric measurement under varying temperature conditions;

calculating final target thicknesses needed for stable temperature response and removing corrective amounts of material from each of the precursor optical elements to provide final thicknesses needed for selected frequency periodicity and stable temperature response.

15. The method as set forth in claim 14 above, including the added step of subdividing the corrected precursor optical elements to multiple microoptic elements of the selected thicknesses and precise optical path lengths.

16. The method as set forth in claim 15 above, wherein the step of removing corrective amounts of material comprises the additional items of measuring the frequency periodicity derived by a differential delay between a first of the precursor optical elements and a known media such as air, calculating the thickness reduction needed to achieve the final target thickness for that optical element, affecting such reduction to provide a corrected first optical element, measuring the frequency periodicity derived by differential delay between the corrected first optical element and the second precursor optical element, calculating the thickness reduction needed to achieve the final target thickness needed for that optical element, and effecting such reduction to provide a corrected second optical element.

17. A method of measuring the optical path lengths of optical elements for use in an interferometric application comprising the steps of:

establishing a first target frequency periodicity of a first optical element;

separating an input optical beam into two beam paths, delaying the optical signal in the first beam path by inserting the first optical element, while separately delaying the optical signal in the second beam path, and interferometrically re-combining the two beam paths into a combined beam path;

determining the first initial frequency periodicity of the combined beam path carried by a single polarization of the interfering optical signals;

adjusting the length of the first optical element to provide a first final frequency periodicity within a closer tolerance to the first target frequency period than that of the first initial frequency periodicity.

18. A method in accordance with claim 17 comprising the additional steps of:

establishing a second target frequency periodicity;

inserting the second optical element into the second beam path;

determining the second initial frequency periodicity at the combined beam path of the interfering optical signals at the combined beam path;

adjusting the length of the second optical element to provide a second final frequency periodicity closer to the second target frequency period than that of the second initial frequency periodicity.

19. The method as set forth in claim 18, wherein the optical elements are further adjusted by the steps of:

determining the temperature dependence of the second final frequency periodicity, and comparing the measured temperature dependence with the target temperature dependence, using the measured temperature dependence of the second final frequency periodicity, determine a new first target frequency periodicity with more precisely athermal characteristics.

20. The method as set forth in claim 19, wherein the target temperature dependence exhibits less than 2 GHz of shift over the operating temperature range.

21. The method as set forth in claim 18, wherein the first target frequency periodicity is determined from calculations using the thermal expansion coefficients, thermo-optic coefficients, indices of refraction, and from the second target frequency periodicity.

22. The method as set forth in claim 19, wherein the second target frequency periodicity is 25.000 GHz, 50.000 GHz, 66.667 GHz, 100.000 GHz, or 200.000 GHZ.

23. The method as set forth in claim 18 above, wherein the frequency periodicity is determined by the step of transmitting optical signals across a range of incrementally different wavelengths, and measuring the optical transmission response to determine the frequency periodicity.

24. The method as set forth in claim 23 above, wherein the step of measuring the amplitude response comprises analyzing the sinusoidal response using a least squares fit, wherein the primary fit parameters are frequency periodicity and phase.

25. The method as set forth in claim 17 above, wherein the optical elements comprise glass blanks having substantially greater cross-sectional areas than are intended for individual elements in an operative systems, and wherein the glass blanks after finishing to the target frequency periodicities are segmented longitudinally in cross section to provide a multitude of microoptic elements of substantially identical target frequency periodicity.

26. A method of providing shared glass elements for use in DWDM applications, wherein the shared elements are to provide an athermal interferometric function with a selected frequency periodicity, comprising the steps of:

calculating target values for two different glasses which establish the athermal condition and desired frequency periodicity;

providing glasses of the different materials that are initially fabricated to slightly greater lengths than the target lengths;

determining the sinusoidal transmission variation resulting from the differential delay of one beam through a first glass element in a first delay path in relation to a different media in the other delay path;

adjusting the length of the first glass element to a close approximation of the target length;

using a second glass element having a predetermined initial length greater than a second target length in the second delay path while retaining the first glass element in the first delay path;

determining the interferometric frequency variations resulting from differential delay of the beams in the different glass elements in the first and second paths;

adjusting the second glass element to a close approximation of the target length.

27. The method of providing optical elements of precise path length and optical delay characteristics for use in DWDM interleaving components operating at selected frequency periodicity within selected frequency bands, comprising the steps of:

generating a variable wavelength beam of monochromatic light in the frequency band of interest;

varying the beam wavelength sequentially to provide a test beam that varies with time incrementally in frequency across the frequency band of interest;

inputting the test beam to a polarization interferometer as a beam which is split into two substantially parallel beams of orthogonal polarization, directed through separate delay paths and then recombined into a single output beam producing a wavelength dependent, intensity modulated output;

interposing in one delay path a first glass delay element of slightly greater thickness than the calculated target thickness, the calculation based on the indices of refraction, thermal expansion coefficients, and thermooptic coefficients of the glasses, to provide both the correct frequency periodicity and low drift of the center wavelength with temperature when combined with one or more additional glass elements in an interleaving component;

employing a different delay media in the other delay path;

measuring the amplitude output at each wavelength from the polarization interferometer;

applying a least squares fit calculation to the measured amplitude output, to extract measured frequency period and phase from the fit;

using the measured frequency period to ascertain the needed reduction in thickness of the first glass element to provide an element with frequency period accurate to within a given frequency period tolerance;

reducing the thickness of the first glass element to the target thickness until the desired frequency accuracy is achieved;

interposing a second glass element of typical index of refraction, thermal expansion and thermooptic coefficient which is of an initial thickness slightly greater than the calculated target thickness needed for the athermal interleaver stage in the second delay path, while maintaining the first glass element in the other parallel delay path;

repeating the sequence of steps of inputting beams sequentially at incrementally varying wavelengths, employing the polarization interferometer to derive wavelength dependent, intensity modulated beams, calculating the frequency periodicity and determining the thickness reduction needed in the second glass element;

reducing the thickness of the second glass element to the target thickness to establish the target periodicity to within the frequency period tolerance; and repeating the same steps as for the second element for any additional glass elements.

28. A method in accordance with claim 27 above, wherein the process is preceded by:

fabricating a first and second glass element to a first and second oversize thickness;

testing the interferometric characteristics of the glass element pair thus provided by measuring the center frequency offset while cycling the temperature of the unit over the desired operating temperature range; and calculating, based on the measured center frequency offset, the target frequency periodicity of the first and second glass element.

29. The method as set forth in claim 27 above, further including the steps of preliminarily adjusting the tilt and tip of each glass element in its delay path to be normal to the input beam, by maximizing the frequency periodicity as measured by the amplitude output.

30. The method as set forth in claim 27 above, wherein the initial glass elements are blanks approximately 100 μm above the target lengths and are of 2 inches or greater in diameter, wherein they are ground and polished to the target thickness by polishing both faces concurrently to achieve a high level of parallelism and low transmitted wavefront distortion, after being formed to the target and wherein the blanks are subdivided into microoptic elements with substantially identical optical characteristics and like thicknesses.

* * * * *